US010447459B2

(12) United States Patent
Fakoorian et al.

(10) Patent No.: US 10,447,459 B2
(45) Date of Patent: Oct. 15, 2019

(54) HD-FDD COMMUNICATION HAVING IMPROVED PEAK DATA RATES

(71) Applicant: QUALCOMM Incorporated, San Diego, CA (US)

(72) Inventors: Seyed Ali Akbar Fakoorian, San Diego, CA (US); Alberto Rico Alvarino, San Diego, CA (US); Peter Gaal, San Diego, CA (US); Hao Xu, San Diego, CA (US); Juan Montojo, San Diego, CA (US); Wanshi Chen, San Diego, CA (US); Renqiu Wang, San Diego, CA (US); Xiao Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 182 days.

(21) Appl. No.: 15/341,775

(22) Filed: Nov. 2, 2016

(65) Prior Publication Data

US 2017/0264419 A1    Sep. 14, 2017

Related U.S. Application Data

(60) Provisional application No. 62/306,585, filed on Mar. 10, 2016.

(51) Int. Cl.

| H04L 5/14 | (2006.01) |
|---|---|
| H04L 5/00 | (2006.01) |
| H04W 72/04 | (2009.01) |
| H04L 1/18 | (2006.01) |
| H04W 4/70 | (2018.01) |
| H04L 1/16 | (2006.01) |

(52) U.S. Cl.
CPC ............. *H04L 5/14* (2013.01); *H04L 1/1822* (2013.01); *H04L 1/1861* (2013.01); *H04L 5/0055* (2013.01); *H04W 4/70* (2018.02); *H04W 72/042* (2013.01); *H04W 72/0413* (2013.01); *H04W 72/0446* (2013.01); *H04W 72/0453* (2013.01); *H04L 1/1621* (2013.01); *H04L 1/1685* (2013.01); *H04L 1/1858* (2013.01)

(58) Field of Classification Search
CPC combination set(s) only.
See application file for complete search history.

(56) References Cited

U.S. PATENT DOCUMENTS

2011/0110262 A1*  5/2011  Yu ............................ H04L 1/0025
                                                                    370/252
2015/0263829 A1*  9/2015  Nguyen ............... H04W 72/1289
                                                                    370/280

OTHER PUBLICATIONS

International Search Report and Written Opinion—PCT/US2017/012116—ISA/EPO—dated Jun. 6, 2017.
Partial International Search Report—PCT/US2017/012116—ISA/EPO—dated Apr. 11, 2017.

(Continued)

*Primary Examiner* — Mansour Oveissi
(74) *Attorney, Agent, or Firm* — Arent Fox, LLP

(57) ABSTRACT

The apparatus improves HD-FDD data transmission rates, e.g., for eMTC by using a self subframe scheduling PDSCH that overlaps a M-PDCCH transmission in time. The apparatus may communicate using ACK(s)/NACK(s) for multiple HARQs that are bundled and/or multiplexed within a subframe in order to increase a number of HARQs.

22 Claims, 14 Drawing Sheets

(56) References Cited

OTHER PUBLICATIONS

Sony: "Report on informal email discussion [eMTC-5] on remaining PDSCH issues for Rel-13 eMTC," 3GPP Draft; R1-157514_INFORMAL_EMAIL_DISCUSSION_EMTC_PDSCH_SUMMARY, 3rd Generation Partnership Project (3GPP), Mobile Competence Centre; 650, Route Des Lucioles; F-06921 Sophia-Antipolis Cedex; FRA, vol. RAN WG1, No. Anaheim, USA; Nov. 15, 2015-Nov. 22, 2015, Nov. 24, 2015, XP051022869, Retrieved from the Internet: URL: http://www.3gpp.org/ftp/tsg_ran/WG1_RL1/TSGR1_83/Docs/ [retrieved on Nov. 24, 2015] pp. 3-6, 9, 12.

* cited by examiner

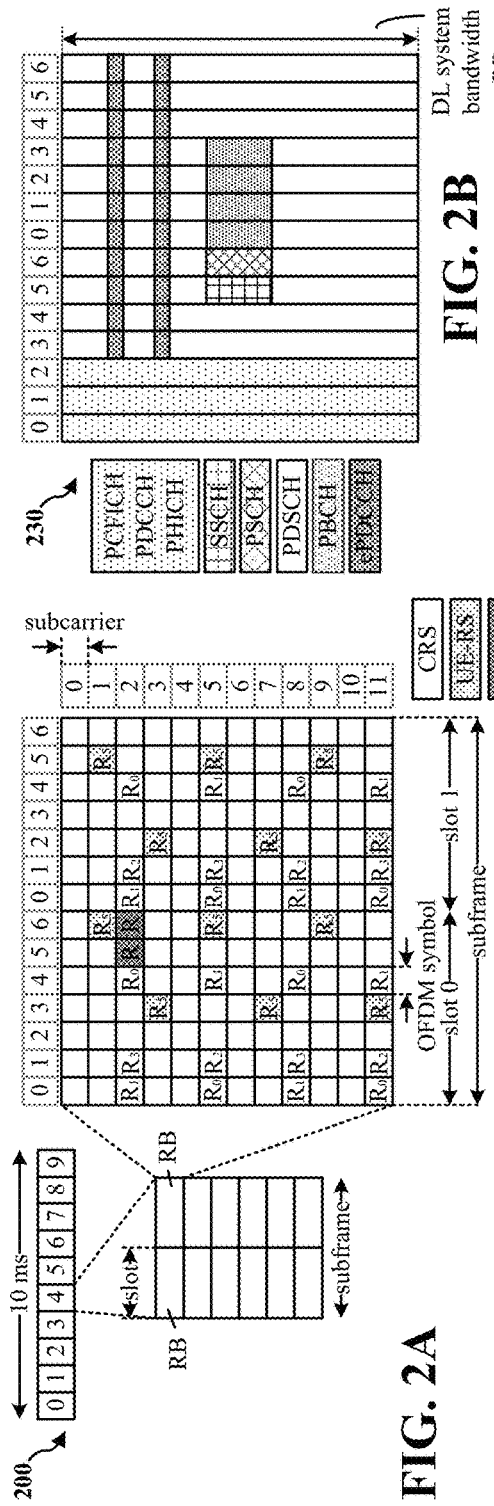
FIG. 2A
FIG. 2B
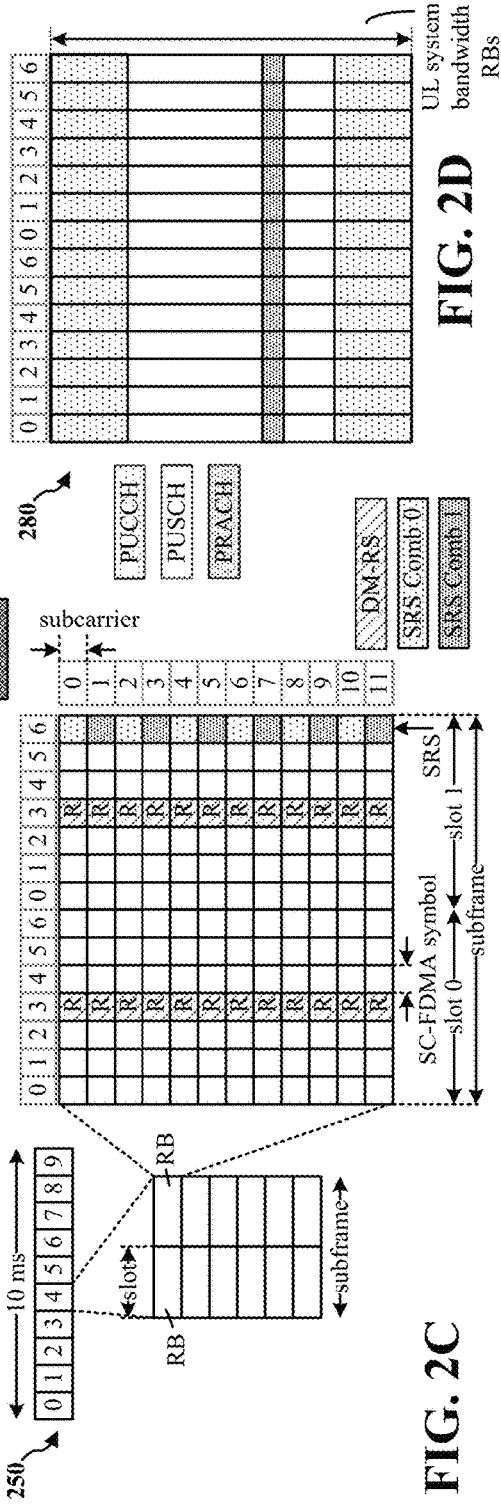
FIG. 2C
FIG. 2D

| SF | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|
| MPDCCH | 0 | 1 | 2 | 3 | 4 | | | | | | 0 | 1 | 2 | 3 | 4 | | | | | |
| PDSCH | 5 | 6 | 0 | 1 | 2 | | | | | | 3 | 4 | 0 | 5 | 6 | | | | | |
| PUCCH | | | | | | D→U 5,6,0 | 1 | 2 | U→D | | | | | | D→U 3,4,0 | 1 | 2 | U→D | | |

| SF | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|
| MPDCCH | 0 | 1 | 2 | 3 | 4 | 5 | 6 | \multicolumn{3}{c}{D→U 7,8,9,10,0,1,2 U→D} | 0 | 1 | 2 | 3 | 4 | 5 | 6 | \multicolumn{3}{c}{D→U 3,4,5,6,0,1,2 U→D} |
| PDSCH | 9 | 10 | 0 | 1 | 2 | 3 | 4 | | | | 5 | 6 | 0 | 1 | 2 | 7 | 8 | 9 | 10 | |
| PUCCH | | | | | | | 6 | | | | | | | | | | 8 | | | |

FIG. 7

HD-FDD COMMUNICATION HAVING IMPROVED PEAK DATA RATES

CROSS-REFERENCE TO RELATED APPLICATION

This application claims the benefit of U.S. Provisional Application Ser. No. 62/306,585, entitled "HD-FDD COMMUNICATION HAVING IMPROVED PEAK DATA RATES" and filed on Mar. 10, 2016, which is expressly incorporated by reference herein in its entirety.

BACKGROUND

Field

The present disclosure relates generally to communication systems, and more particularly, to half duplex frequency division duplex (HD-FDD) associated with enhanced machine type communication (eMTC).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

A focus of the traditional LTE design relates to the improvement of spectral efficiency, ubiquitous coverage, and enhanced quality of service (QoS) support, etc. Current LTE system down link (DL) and uplink (UL) link budgets may be designed for coverage of high end devices, such as state-of-the-art smartphones and tablets. However, it may be desirable to support low cost low rate devices as well. Low cost, low data rate devices may communicate, e.g., using half duplex frequency division duplex (HD-FDD) wireless communication. Such communication, e.g., low-cost machine type communications (MTC) or enhanced MTC (eMTC) may involve a reduction in a maximum bandwidth, use of a single receive radio frequency (RF) chain, a reduction in peak rate, a reduction in transmit power, the performance of half duplex operation, etc.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

MTC or eMTC communication may involve low-cost UEs that communicate using HD-FDD wireless communication. The low-cost devices might not have simultaneous uplink/downlink capability while operating in FDD. Current subframe configurations may lead to limitations on maximum data rates for these low-cost devices.

Aspects presented herein improve HD-FDD data transmission rates, e.g., for eMTC, by communicating using a self subframe scheduling PDSCH and/or ACK(s)/NACK(s) for multiple HARQs that may be bundled or multiplexed within a subframe.

In an aspect of the disclosure, a method, a computer-readable medium, and an apparatus are provided for wireless communication using HD-FDD, e.g. eMTC. The apparatus transmits a plurality of consecutive subframes of a Machine Type Communication Physical Downlink Control Channel (M-PDCCH); and begins a downlink transmission using self subframe scheduling, the downlink transmission overlapping the transmission of the plurality of consecutive subframes of the M-PDCCH in time. The downlink transmission may comprise a Physical downlink Shared Channel (PDSCH).

In another aspect of the disclosure, a method, a computer-readable medium, and an apparatus are provided for wireless communication using HD-FDD, e.g. eMTC. The apparatus receives a plurality of consecutive subframes of a PDSCH and transmits an acknowledgement for a plurality of Hybrid Automatic Repeat Requests (HARQs) within a single subframe using at least one of ACK/NACK bundling or ACK/NACK multiplexing. The apparatus may receive signaling information regarding the ACK/NACK bundling to be used for transmitting acknowledgement for the HARQs. The apparatus may transmit an acknowledgement for the HARQs using both ACK/NACK bundling and ACK/NACK multiplexing.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

FIG. 6 illustrates an example radio frame configuration for HD-FDD, e.g., for eMTC, with bundled/multiplexed HARQ acknowledgements.

FIG. 7 illustrates an example radio frame configuration for HD-FDD, e.g., for eMTC, with bundled/multiplexed HARQ acknowledgements.

DETAILED DESCRIPTION

Figure 1:
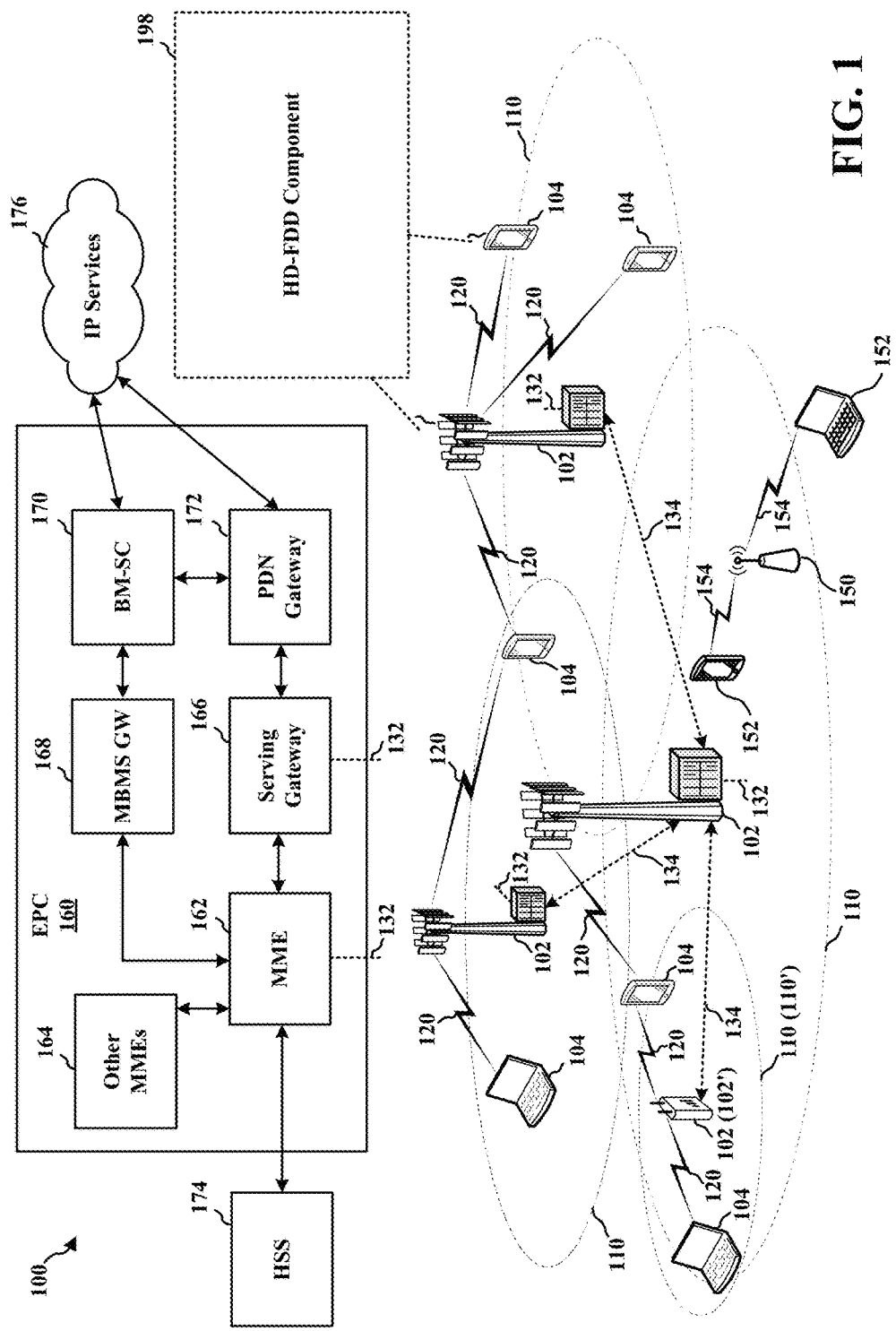
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Category 0 UEs may have a reduced performance requirement that meets the needs of many applications while significantly reducing complexity and power consumption. Category 0 UEs may include machine type communication (MTC) UEs MTC UEs may monitor DL control channels in the same way as regular UEs (e.g., wideband, both Physical Downlink Control Channel (PDCCH) and Enhanced Physical Downlink Control Channel (EPDCCH), etc.).

Referring again to FIG. 1, in certain aspects, UE 104/eNB 102 include an HD-FDD component 198 configured to improve HD-FDD data transmission rates by communicating, e.g., using eMTC, using a self subframe scheduling PDSCH. The employed HARQ process may include bundling or multiplexing multiple HARQ acknowledgements within a subframe.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
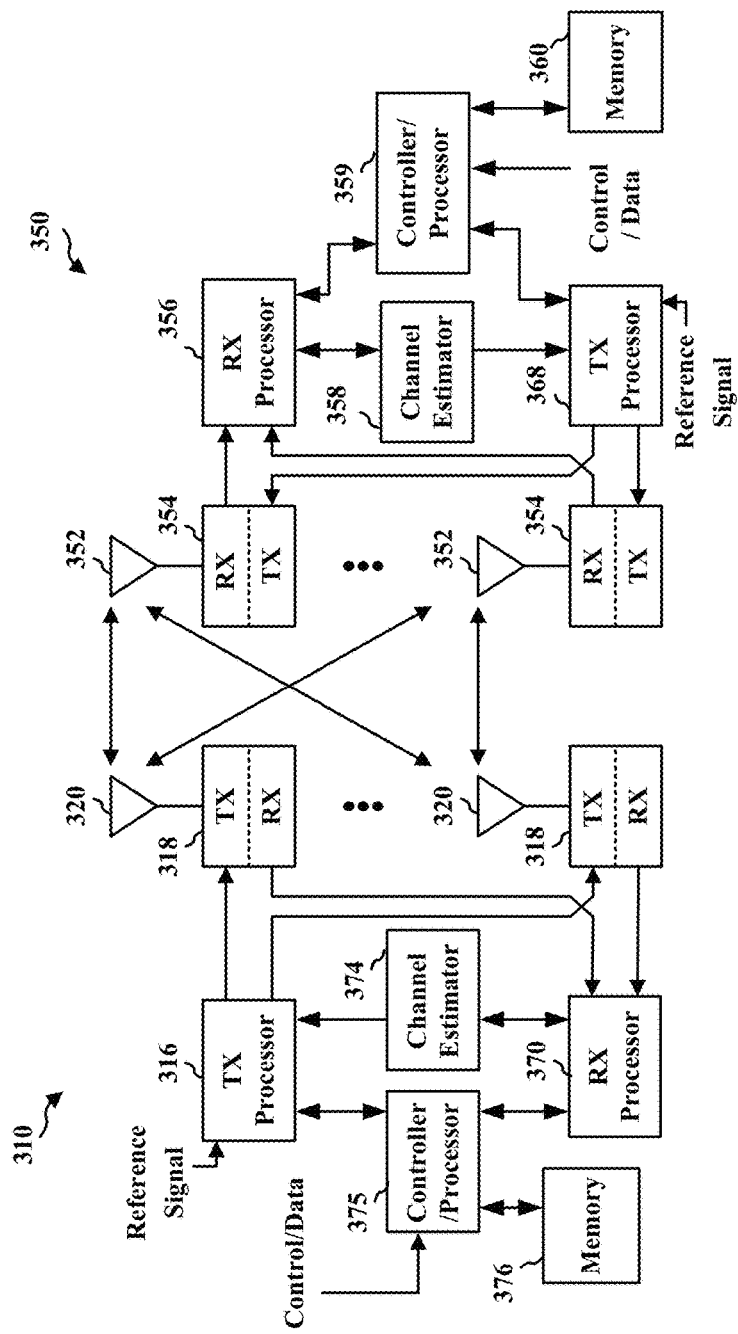
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Aspects presented herein may relate to low-cost UEs without simultaneous uplink/downlink capability operating in FDD, such as MTC or eMTC devices. These UEs may communicate using HD-FDD communication.

A UE may operate in Full Duplex (FD) mode, where Rx and Tx operations are concurrent, or in Half Duplex (HD) mode, where Rx and Tx operations never occur simultaneously.

In a Full Duplex Frequency Division Duplex (FD-FDD) system, the UE receiver and transmitter operate simultaneously on different frequencies. The different frequencies provide the necessary separation between uplink and downlink signal paths.

Alternately, different carrier frequencies can be used for a Half Duplex FDD (HD-FDD) where uplink and downlink communications are not only on distinct frequencies but are also separated in the time domain. In order to fully utilize transmission resources, an eNB may schedule different UEs at mutually exclusive times. Therefore, the eNB may effectively work in full-duplex mode while the UEs each operate in HD-FDD mode.

An MTC UE may be implemented with reduced peak data rates (e.g., a maximum of 1000 bits for a transport block size). Further, an MTC UE may be limited to supporting rank 1 transmission and having 1 receive antenna. When an MTC UE is half-duplex, the MTC UE may be implemented with a relaxed switching timing (from transmission to reception or reception to transmission) in comparison to legacy or non-MTC UEs in accordance with the LTE standards. For example, a non-MTC UE may have a switching time of 20 microseconds, while an MTC UE may have a switching time of 1 millisecond. MTC UEs may monitor DL control channels in the same way as non-MTC UEs (wideband, both PDCCH and EPDCCH, etc.)

Additional MTC enhancements (eMTC) may be supported. For example, an MTC UE usually performs narrowband operations, but it may also be able to work in a wider system bandwidth (e.g., 1.4/3/5/10/15/20 MHz). An MTC UE may work in a 1.4 MHz frequency band or may use six resource blocks. Further, the MTC UEs may have enhanced coverage up to 15 dB.

Current subframe configurations for HD-FDD communication, e.g., for eMTC, lead to limitations on maximum data rates.

Aspects presented herein improve HD-FDD data transmission rates by communicating using a self subframe scheduling PDSCH. Additionally, ACK(s)/NACK(s) for multiple HARQs may be bundled or multiplexed within a single subframe.

Currently, the set of subframes to be used for DL transmission can be explicitly and cell-specifically signaled, e.g., by a System Information Block (SIB) such as SIB1-Bandwidth Reduced (BR). The set of subframes to be used for UL transmission can also be explicitly and cell-specifically signaled, e.g., by MTC-SIB.

The start of a DL transmission is currently required to be at least 2 ms after the end of its associated M-PDCCH. Similarly, the start of UL A/N transmission is required to be 4 ms after the end of the corresponding PDSCH transmission.

Therefore, in one example having 5 DL subframes, 3 UL subframes, and 2 invalid subframes, under the current configuration, only 3 HARQs are possible. This limits the maximum data rate. For example for a max Transport Block Size (TBS) of 1000 bits, only a peak data transmission of 300 kbps can be achieved.

Figure 4:
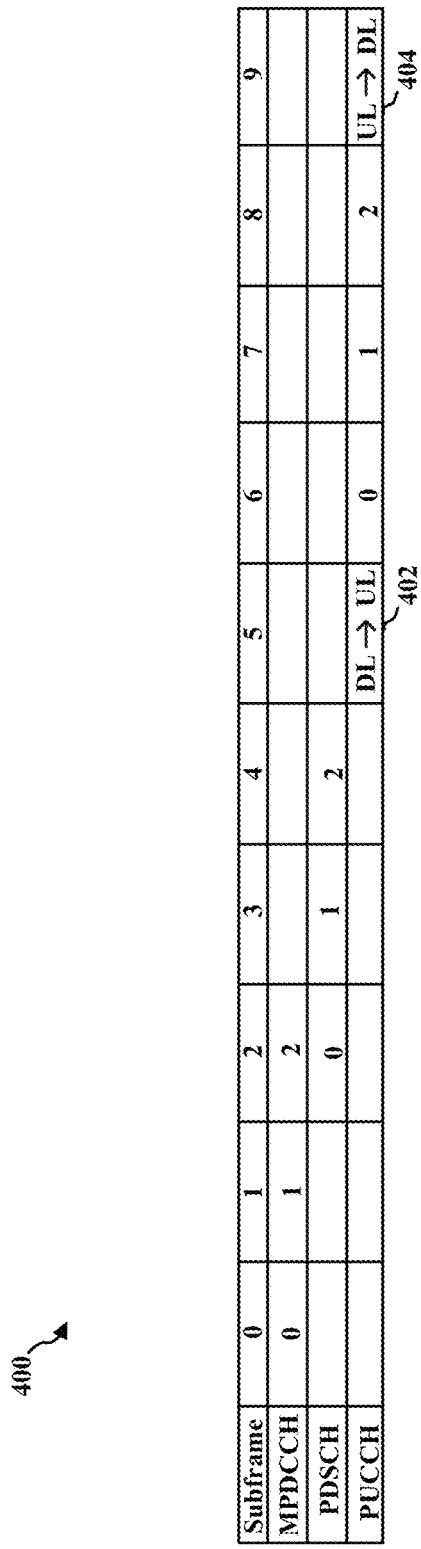
FIG. 4 illustrates an example radio frame configuration for HD-FDD, e.g., for eMTC.

FIG. 4 illustrates an example chart 400 of HD-FDD configuration, e.g., for eMTC, with 10 subframes. The first row of the chart 400 shows the Subframe number, e.g., 0-9. A number of the subframes may be downlink, a number may be uplink, and a number may be reserved for a transition between downlink frames and uplink subframes, also referred to herein as "invalid" subframes. For example, subframe 5, 402 provides a transition from DL to UL subframes and subframe 9, 404 provides a transition from uplink subframes to DL subframes, e.g., for DL transmissions in the next set of subframes. In FIG. 4, subframes 0, 1, and 2 are DL subframes used by the eNB to transmit M-PDCCH, the three subframes of the M-PDCCH being indicated as 0, 1, and 2. Subframes 2, 3, and 4 are also DL subframes, used by eNB to transmit data on PDSCH corresponding to the indication previously transmitted on M-PDCCH, the data being designated by 0, 1, and 2. Thus, PDSCH for HARQ ID 0 is transmitted in subframe 2 and the HARQ ID for the PDSCH transmission was indicated in M-PDCCH at subframe 0. After the transition subframe 402 at subframe 5, subframes 6, 7, and 8 are UL subframes used by the UE to transmit uplink HARQ using M-PUCCH regarding the PDSCH transmissions that it received from the eNB in subframes 2, 3, and 4. This example, only provides an MPDSCH peak of 300 kbps. For example, the HARQ ID 0, corresponds to the PDSCH transmission at subframe 2 and the HARQ ID indication received in M-PDCCH at subframe 0.

Figure 5:
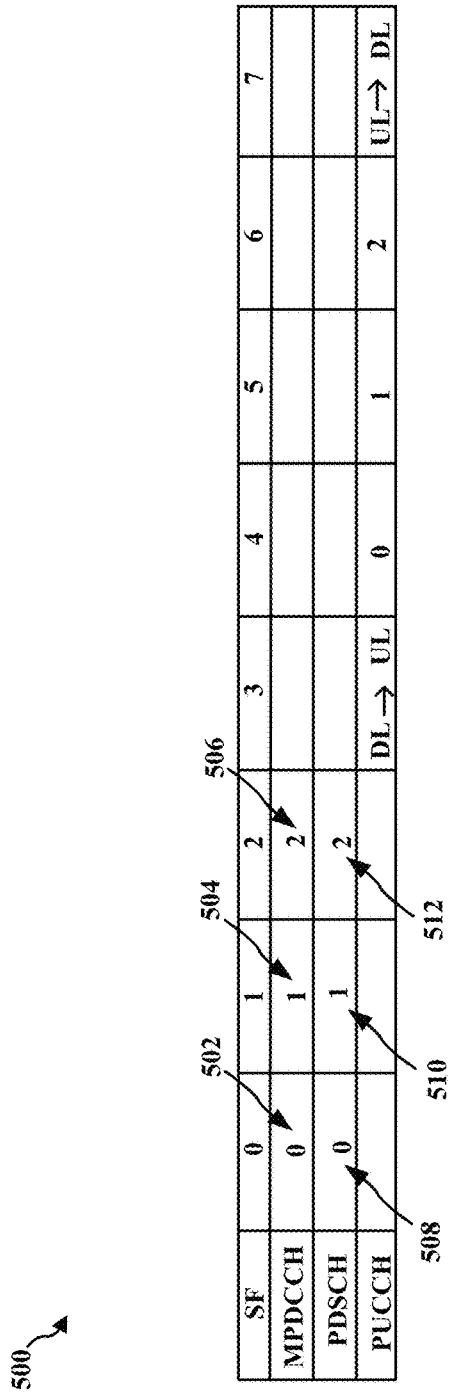
FIG. 5 illustrates an example radio frame configuration for HD-FDD, e.g., for eMTC.

FIG. 5 illustrates one example HD-FDD configuration 500, e.g., for eMTC, that increases the peak data rate in accordance with aspects presented herein. This increase in the maximum data rate may be achieved by using a self scheduling PDSCH and relaxing the 2 ms constraint between the DL transmission of the HARQ ID in M-PDCCH and the PDSCH with the corresponding HARQ ID. For example, by using a self subframe scheduling transmission, the PDSCH may be transmitted at the same time as the M-PDCCH, enabling a peak data transmission rate of 375 kbps to be achieved. For example, in FIG. 5, HARQ ID 0 is indicated in M-PDCCH at subframe 0 and PDSCH for the corresponding HARQ ID 0 is also transmitted in subframe 0. In this example, an eNB using HD-FDD may transmit a plurality of consecutive subframes, e.g., 502, 504, 506 of M-PDCCH and may begin a PDSCH downlink data transmission, e.g., 508, 510, 512, overlapping the M-PDCCH by using self subframe scheduling for the PDSCH. The configuration in FIG. 4 allowed only 3 HARQs for 10 subframes. However, by transmitting PDSCH in the same subframe as the corresponding HARQ ID is indicated in M-PDCCH, as in FIG. 5 enables 3 HARQs in only 8 subframes.

FIG. 6 illustrates a second example HD-FDD configuration 600, e.g., for eMTC, that may also be used to increase the maximum data rate. In FIG. 6, the increase may be achieved by ACK/NACK bundling or multiplexing for PDSCH. In FIG. 6, HARQs 5, 6, and 0 are bundled or multiplexed together in a subframe at 602 and HARQs 3, 4, and 0 are bundled or multiplexed in a subframe at 604. Other HARQs may be transmitted without being bundled or multiplexed, e.g., as illustrated at 606, 608, 610, and 612. The example, in FIG. 6 maintains the two subframe spacing between the HARQ ID indication in M-PDCCH and the PDSCH transmissions for the corresponding HARQ ID. Using 7 HARQs, such as illustrated and such ACK/NACK bundling/multiplexing enables a peak data rate of 500 kbps to be achieved. Thus, the peak data rate may be increased by providing an increased number of HARQs, e.g., using ACK/NACK bundling or multiplexing. For example, FIG. 6 a process that uses 7 HARQs over 20 subframes.

The ACK/NACK bundling of FIG. 6 can be used in combination with transmitting self subframe scheduling DL PDSCH, as described in connection with FIG. 5. Alternately, the ACK/NACK bundling can be performed while maintaining the 2 ms constraint between the M-PDCCH and PDSCH transmissions.

FIG. 7 illustrates another example HD-FDD configuration 700, e.g., for eMTC, showing a larger number of bundled/multiplexed ACK/NACKs. FIG. 7 illustrates an increased number of HARQs from FIG. 6. FIG. 7 illustrates a configuration with 11 HARQs, where FIG. 6 illustrates 7 HARQs. Both FIG. 6 and FIG. 7 illustrate an increased number of HARQs from FIGS. 4 and 5, which only have 3 HARQs in 8 or 10 subframes. FIG. 7 illustrates the bundling/multiplexing of each of the ACK/NACKs, whereas FIG. 6 included some individual ACK/NACKs at 606, 608, 610, 612. By bundling each of the ACK/NACKs, FIG. 7 illustrates that this type of UL transmission can be achieved within a single subframe at 702 or 704 before transitioning to receiving DL transmissions at subframe 9. Using ACK/NACK bundling and 11 HARQs may enable a peak data transmission rate of 700 kbps. Although this example illustrates an example with 11 HARQs, this is merely one example. The aspects of FIG. 7 may be used to provide any number of increased HARQs, e.g., 8 or more HARQs, 10 HARQs, etc.

ACK/NACK bundling or multiplexing for HD-FDD may be used, e.g., when there are more DL subframes than UL subframes available in a radio frame. The ACKs/NACKs may be bundled and/or multiplexed.

Bundling may use, e.g., a logical AND, and send 1 bit for all of the bundled ACKs/NACKs together. Bundling may be more beneficial than multiplexing when there are only a few HARQs to be acknowledged.

When many HARQs are to be acknowledged, it might be a better solution to multiplex the ACKs rather than to bundle the ACKs. Multiplexing uses 1 bit for each HARQ acknowledgement and employs additional coding before transmitting multiplexed ACK/NACKs. Multiplexing may require an increased transmission power in comparison to bundling.

In another option, a combination of bundling and multiplexing may be used. For example, for four HARQs 0, 1, 2, and 3, the acknowledgement for 0 and 2 may be bundled into a first bundle "0×2" and the acknowledgement for 1 and 3 may be bundled into a second bundle "0×3", and these two bundles may then be multiplexed. For example, for 0, 1, 2, 3→(0×2, 1×3).

In the example in FIG. 6, in subframe 6, the ACK/NACK bits corresponding to PDSCH HARQ IDs 5, 6, and 0 may be bundled, e.g., using the logical AND.

If a UE misses the grant for 0, but acknowledges the grant for 5 or 6, then the eNB may wrongly assume that all three of the grants (5, 6, and 0) are acknowledged. This issue may arise in eMTC FDD, which involves valid UL/DL subframes. In legacy LTE, a Downlink Assignment Index (DAI) field in Downlink Control Information (DCI) for TDD lets the UE know how many grants should be acknowledged.

In order to address this problem of bundled acknowledgements leading an eNB to incorrectly assume that missed grant has been received, a DAI field in DCI may be used for HD-FDD. The DAI field may be used, e.g., when there are more DL subframes than UL indicated in SIB1-BR. SIB1 indicates DL and UL information. Therefore, when a UE received more DL subframes that were indicated in SIB1-BR, the UE may anticipate that in DCI, there will be a DAI field letting the UE know how many HARQs should be acknowledged. While this solves the problem, it requires a new field to be used in eMTC.

Alternately, this problem may be addressed by applying the combination of multiplexing and bundling, e.g., by bundling the acknowledgement for 5 and 6 and multiplexing the bundled acknowledgement with the ACK/NACK for 0, e.g., (5×6, 0). This combined bundling and multiplexing might not completely solve the problem, because an eNB might still assume that the ACK for 5 and 6 is for all of the HARQs. However, it reduces the likelihood that the eNB will make an incorrect assumption.

In order to increase data transmission rates using the aspects described in connection with FIGS. 5-7, it may be important to let the UE know which subframes should be used for PUCCH.

In a first example, the eNB may signal a TDD configuration to the UE. This signal may let the UE know that the uplink HARQ timing follows legacy TDD timing. This would allow the UE to know which HARQs should be bundled or multiplexed.

In a second example, the eNB may separately signal a set of valid subframes for PUCCH to the UE. This lets the UE know that it may use these frames to perform ACK/NACK bundling or multiplexing. This may also include some indication to the UE regarding resources to be used for ACK/NACK bundling or multiplexing.

In third example, a set of PUCCH configurations may be defined, and the UE may be configured with one of these configurations. For example, the set of PUCCH configurations may be defined in a standard. One example a first PUCCH configuration may allow all Subframes 0 and 1 of all radio frames to be used for PUCCH, and a second configuration may allow only subframe 0 of even radio frames to be used for PUCCH.

The UE may be able to determine the appropriate PUCCH configuration implicitly, e.g., based on a coverage enhancement level, etc. For example, a UE with good coverage may be configured with the second configuration (only subframe 0 of even radio frames) where a UE with poor coverage may be configured with the first configuration (subframes 0, 1 of all radio frames). The UE may determine which configuration to use based on whether the UE is experiencing a threshold level of coverage.

Alternately, the UE may receive an indication regarding the PUCCH configuration that should be used. For example, the PUCCH configuration may be indicated in Radio Resource Control (RRC) signaling or it may be signaled in a grant. The configuration may change based on a bundle size of the PUCCH, e.g., based on the number of acknowledgements to be bundled.

In a fourth example, the UE may be triggered to send a group acknowledgement when needed. For example, an eNB may send a signal triggering the UE to send a group acknowledgement. This allows the eNB to control the group ACKs based on its need for feedback from the UE.

There may also be a relationship between a Transmission Time Interval (TTI) bundle size depending on an amount of HARQ multiplexing that is employed.

In a first example, different TTI bundle repetition values may be employed depending on the number of multiplexed ACKs/NACKs. In one example, a TTI bundle repetition value of 1 may be used for an acknowledgement of a single HARQ and a repetition value of 2 may be used for a multiplexed ACK of multiple HARQs.

In a second example, a UE may determine the TTI bundle size for PUCCH implicitly depending on whether multiplexing is employed. For example, if ACK multiplexing is enabled, the UE may determine that the TTI bundle size R is more than one, e.g., 2. If TTI bundling is available, the UE may determine to use ACK/NACK multiplexing rather than ACK/NACK bundling, because this indicates that there are more available resources.

In a third example, the repetition vale R may depend on the power headroom. For example, if 3 dB of power boosting is available to the UE, then the UE may use a repetition value of 1 with the 3 dB power boost. If the increased power boosting is not available, the UE may instead use a higher repetition value, e.g., a repetition value of 2.

As illustrated in connection with FIGS. 6 and 7, in certain subframes, ACK multiplexing may be employed, with or without ACK/NACK bundling.

As illustrated in FIG. 6, multiplexed ACKs/NACKs may be on PUCCH, e.g., at 602 and 604, and a single ACK/NACK may be sent on other subframes e.g., 606, 608, 610, 612. The multiplexed ACKs/NACKs may be TTI bundled on PUCCH, while the single ACK/NACKs may be transmitted with reduced or without any repetition. For example, for UEs with normal coverage. TTI bundling may also be employed for the single ACK/NACK. The repetition may be reduced compared to the multiplexed ACKs/NACKs or may be the same as the multiplexed ACKs/NACKs.

Figure 8:
FIG. 8 illustrates an example radio frame configuration for HD-FDD, e.g., for eMTC, with bundled/multiplexed acknowledgements and TTI bundling.

FIG. 8 illustrates an example configuration 800, e.g., in eMTC, where the ACKs/NACKs for HARQs 5, 6, and 0 are TTI bundled in subframes 6 and 7. The ACK/NACK for single HARQ 1 is scheduled only in subframe 7. The TTI bundle size may be determined based on the associated M-PDCCH, or the TTI bundle size may be based on the coverage level of the UE. As TTI bundling is employed, the ACK/NACK for 5, 6, 0 may be multiplexed, with or without ACK/NACK bundling.

As illustrated in FIG. 8, there may be an overlap in scheduled resources by the eNB for subframe 7. When the eNB receives the multiple ACKs/NACKs from the UE for this resource, the eNB may mistakenly assume that a failed HARQ is acknowledged.

Any of a number of strategies may be employed by the UE to enable the eNB to accurately identify failed HARQs.

In subframe 7, the eNB may assign 2 PUCCH resources to the eMTC UE, e.g.:

1—A first PUCCH resource for the repetition of bundled (or multiplexed) HARQs 5, 6, 0 ("PUCCH No. 1")

2—A second PUCCH resource for single HARQ 1 ("PUCCH No. 2")

The eMTC UE may not (or cannot) use both of the assigned PUCCH resources. If HARQ_id 1 is an ACK, the eMTC UE may use PUCCH No. 2 to transmit bundled and/or multiplexed HARQs 5, 6, 0. If HARQ_id 1 is a NACK, the UE may use the PUCCH No. 1 to transmit bundled and/or multiplexed HARQs 5, 6, 0.

However, if the eNB has assigned only a single PUCCH resource to the eMTC UE, that single PUCCH resource should be used for both single HARQ_id 1 and bundled and/or multiplexed HARQ_ids 5, 6, 0. In this case, the HARQ_id 1 may be superimposed to the reference signal of the assigned PUCCH. Therefore, the PUCCH resource may be used to transmit bundled and/or multiplexed HARQs 5, 6, 0. The UE may superimpose the ACK/NACK for HARQ 1 on the reference signal(s) of the PUCCH resource in subframe 7. For example, if HARQ_id 1 was successfully received, the UE may multiply the reference signal for HARQ_ids 5, 6, 0 by +1. If HARQ_id 1 failed, the UE may use a −1 to multiply the reference signal for HARQ_ids 5, 6, 0 in order to indicate a NACK.

In an additional aspect, it may be important to establish which of the DL grants indicates the UL PUCCH resources to be used. For example, the UE may need to determine which of 5, 6, 0 in FIG. 8, indicates the UL PUCCH resources in subframe 6, as well as 7 due to the TTI bundling.

In one example, the first grant, e.g., associated with HARD ID 5, may indicate the UL PUCCH that the UE should use for all bundled HARQs. In another example, the last grant, e.g., 0, may also indicate the UL PUCCH that the UE should use for all bundled HARQs. In the example in FIG. 8, the resources for bundled HARQs are illustrated as subframes 6 and 7. As illustrated, the HARQs corresponding to HARQ ID 5, 6, and 0 may be bundled in subframe 6 and the HARQs corresponding to HARQ ID 5, 6, 0, and 1 may be bundled in subframe 7

In another example, the UE may use a fixed grant for bundled/multiplexed ACKs/NACKs. In this example, the UE may be aware of a predetermined grant that should be used when bundling HARQs. The UE may also disregard the grant transmitted from the eNB in the MPDCCH for each of the corresponding HARQs and may instead use the predetermined grant for transmitting a bundled HARQ.

In another example, each of the DL grants for bundled HARQs may address the same UL PUCCH resource. The resource may include both a subframe and a resource block. For example, each of the DL grants for bundled HARQs for the PDSCH for HARQ ID 5, 6, 0, and 1 may address subframe 6 and subframe 7 in FIG. 8.

Figure 9:
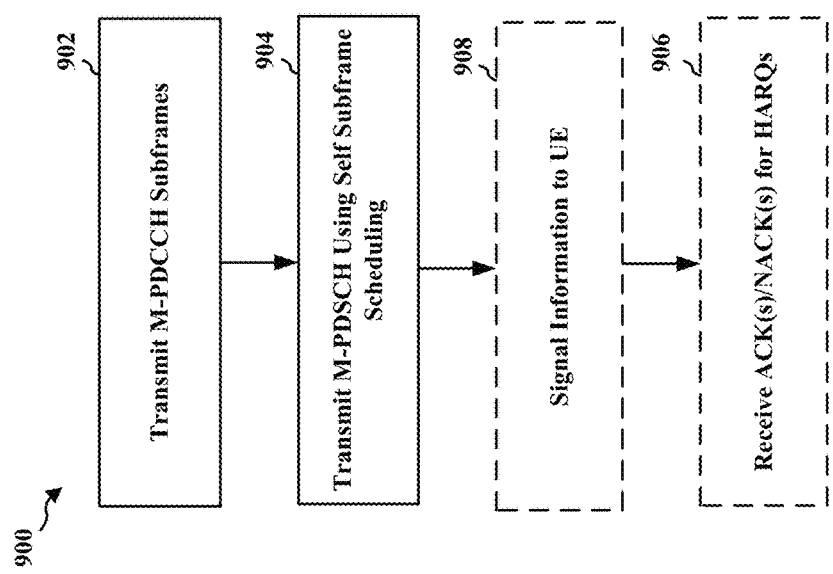
FIG. 9 is a flowchart of a method of HD-FDD wireless communication, e.g., for eMTC.

FIG. 9 is a flowchart 900 of a method of wireless communication using HD-FDD, e.g., for eMTC. The method may be performed by an eNB (e.g., the eNB 102, 310, the apparatus 1002/1002'). The wireless communication may involve communication with low-cost UEs without simultaneous UL/DL capability operating in FDD. Optional aspects in FIG. 9 are illustrated with a dashed line.

At 902, the eNB transmits a plurality of consecutive subframes of an M-PDCCH. For example, eNB 102, 310 may transmit the consecutive subframes of the M-PDCCH to UE 104, 350. FIG. 5 illustrates an example in which the M-PDCCH is transmitted in subframes 0, 1, and 2.

At 904, the eNB begins a downlink transmission using self subframe scheduling overlapping transmission of the plurality of consecutive subframes of the M-PDCCH in time, e.g., as in the example illustrated in FIG. 5. The DL transmission may be a PDSCH transmission, e.g., M-PDSCH. For example, FIG. 5 illustrates the eNB transmitting the M-PDCCH overlapping its transmission of the PDSCH in subframes 0, 1, and 2.

The eNB may also, optionally, receive ACK/NACK transmissions at 906, e.g., 4 ms after the PDSCH transmission ends. For example, FIG. 5 illustrates an acknowledgement regarding the PDSCH from subframe 0 being sent in subframe 4. The ACK/NACK transmission may include ACK/NACK bundling or multiplexing, using principles explained in connection with the examples illustrated in FIGS. 6-8. As one example, FIG. 6 illustrates the ACK/NACK being bundled or multiplexed in subframe 6. The ACK/NACK received by the eNB at 906 may correspond to the ACK/NACK transmitted by a UE at 1204 in FIG. 12, including the possible aspects described in connection with 1206, 1208, 1212, 1214, or 1216.

The eNB may signal information to the UE at 908 to assist the UE in determining the subframes for PUCCH. The eNB may signal a set of valid subframes for PUCCH. The eNB may signal a TDD configuration to the UE indicating that the HARQ timing follows legacy TDD timing. The eNB may signal which of a defined set of PUCCH configurations should be used by the UE. The eNB may trigger the UE to send a group ACK.

Figure 10:
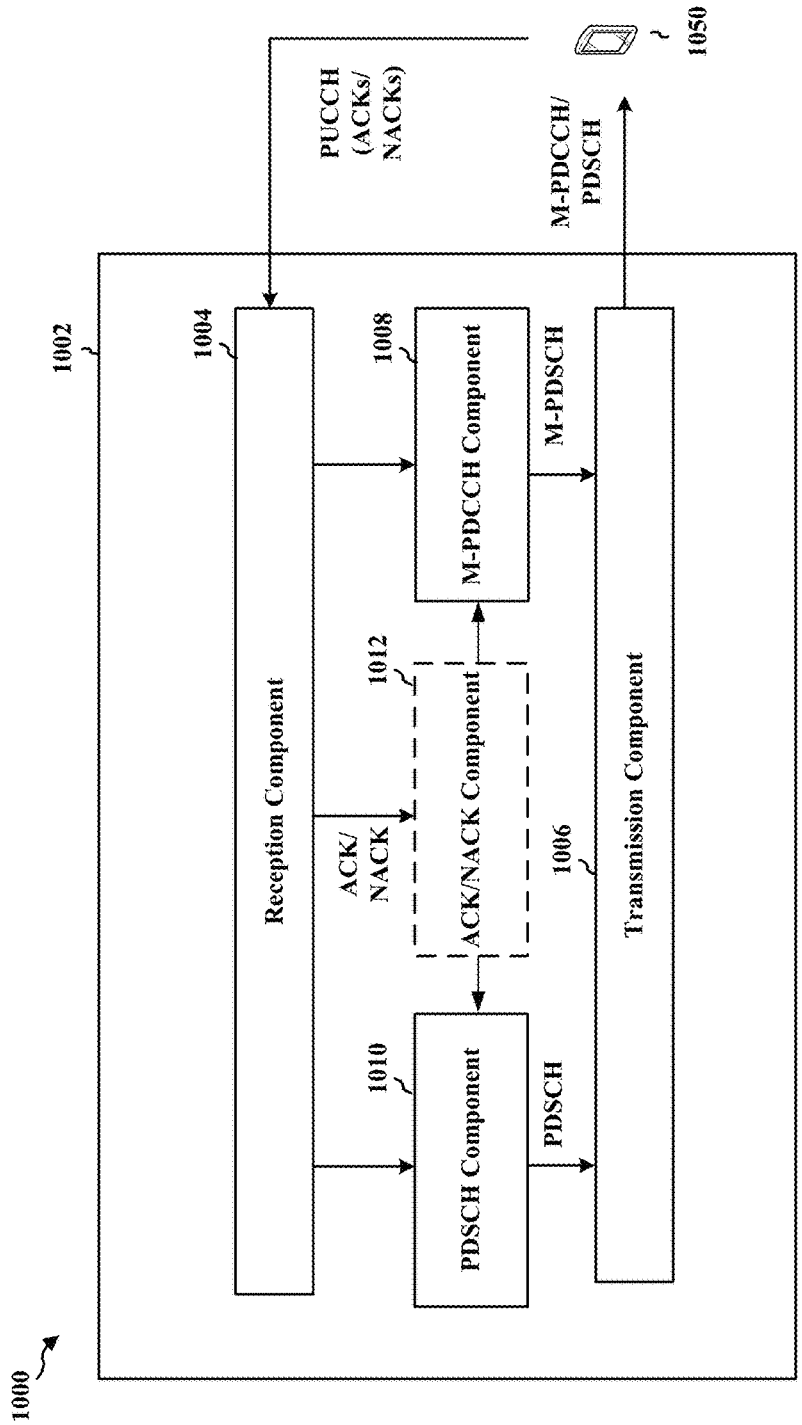
FIG. 10 is a conceptual data flow diagram illustrating the data flow between different means/components in an example apparatus.

FIG. 10 is a conceptual data flow diagram 1000 illustrating the data flow between different means/components in an exemplary apparatus 1002, e.g., using, e.g., for eMTC. The apparatus may be an eNB. The apparatus includes a reception component 1004 that receives wireless communication, e.g., HD-FDD communication from a UE 1050. The apparatus includes a transmission component 1006 that transmits wireless communication, including M-PDCCH and PDSCH to the UE 1050. The apparatus includes a M-PDCCH component 1008 that transmits a plurality of consecutive subframes of an M-PDCCH and a PDSCH component 1010 that begins a downlink transmission using self subframe scheduling overlapping the transmission of the plurality of consecutive subframes of the M-PDCCH in time. The apparatus may optionally include an ACK/NACK component 1012 that receive ACK/NACK transmissions after the PDSCH transmission ends. The ACK/NACK transmission may include ACK/NACK bundling or multiplexing, using principles explained in connection with the examples illustrated in FIGS. 6-8.

The transmission component may be configured to signal information to the UE 1050 to let the UE know which subframes should be used for PUCCH or to indicate to the UE whether to use ACK/NACK multiplexing and/or bundling.

The apparatus may include additional components that perform each of the blocks of the algorithm in the aforementioned flowcharts of FIG. 9. As such, each block in the aforementioned flowcharts of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
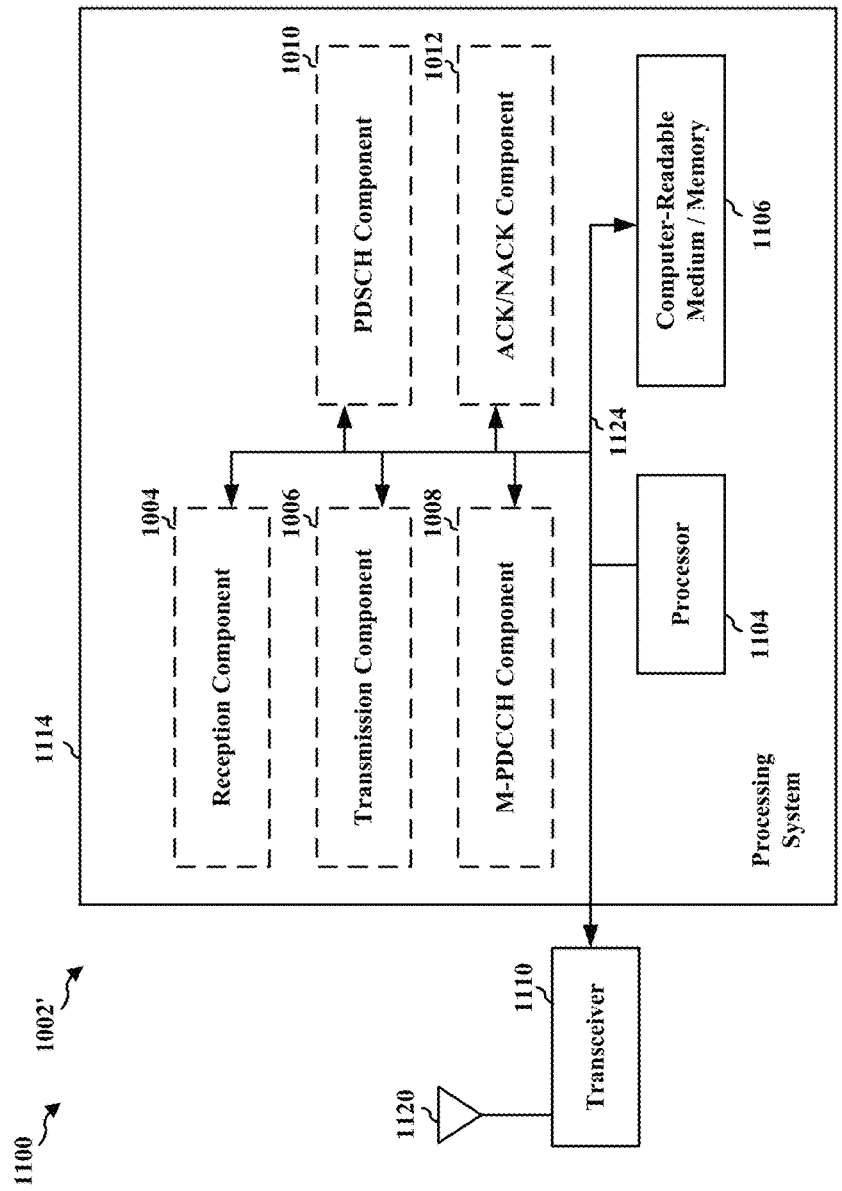
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, and 1012, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, and 1012. The components may be software components running in the processor 1104, resident/stored in the computer readable medium/memory 1106, one or more hardware components coupled to the processor 1104, or some combination thereof. The processing system 1114 may be a component of the eNB 310 and may include the memory 376 and/or at least one of the TX processor 316, the RX processor 370, and the controller/processor 375.

In one configuration, the apparatus 1002/1002' for wireless communication includes means for transmitting a plurality of consecutive subframes of an M-PDCCH, means for beginning a downlink transmission using self subframe scheduling, the downlink transmission overlapping the M-PDCCH transmission in time, means for receiving ACKs/NACKs, and means for signaling information to a UE. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 12:
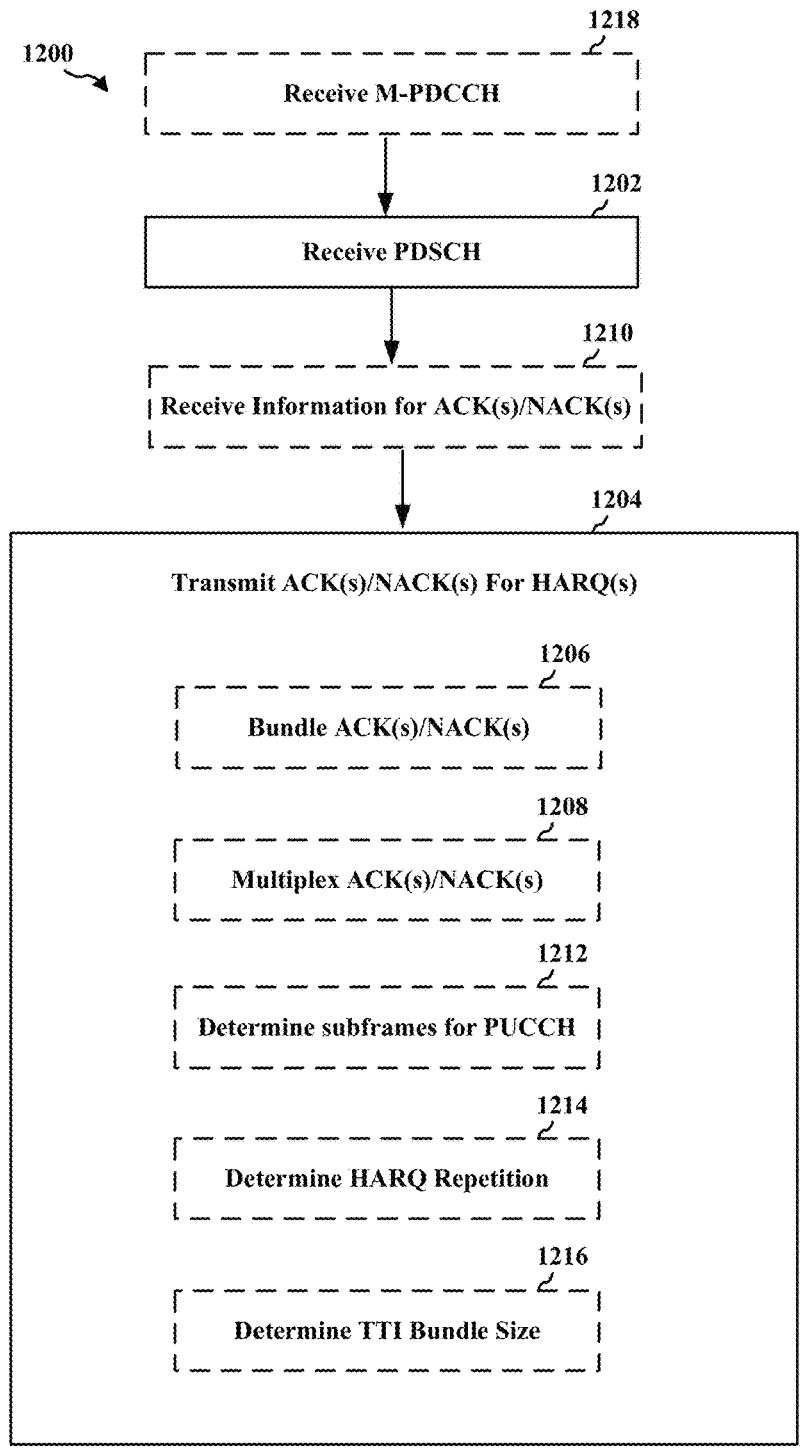
FIG. 12 is a flowchart of a method of HD-FDD wireless communication, e.g., for eMTC.

FIG. 12 is a flowchart 1200 of a method of wireless communication using HD-FDD communication, e.g., eMTC. The method may be performed by a UE (e.g., the UE 104, 350, the apparatus 1302/1302'). The UE may be a low-cost UEs without simultaneous UL/DL capability operating in FDD.

At 1202, the UE receives a plurality of consecutive subframes of a PDSCH. For example, UE 104, 350 may receive consecutive subframes of a PDSCH from eNB 102, 310. For example, FIGS. 6 and 8 illustrate reception by a UE of consecutive frames of a PDSCH from an eNB at subframes 0, 1, 2, 3, 4. FIG. 7 illustrates an example in which a UE receives consecutive frames of a PDSCH from an eNB at subframes 0, 1, 2, 3, 4, 5, 6.

At 1204, the UE transmits an acknowledgement for plurality of HARQs within a single subframe using at least one of ACK/NACK bundling at 1206 and/or ACK/NACK multiplexing at 1208, e.g., as described in connection with any of FIGS. 6-8. For example, the UE may transmit an acknowledgement for an increased number of HARQs. The increased number of HARQs may be more than the typical 8 HARQs, e.g., 10 HARQs. In FIG. 6, the UE transmits an increased number of HARQs by bundling or multiplexing the HARQ for HARQ ID 5, 6, and 0 in SF 6. In the example of FIG. 7, the UE increases the number of HARQs by bundling or multiplexing the acknowledgement for HARQ ID 7, 8, 9, 10, 0, 1, and 2. In the example in FIG. 8, the UE increases the number of HARQs by bundling or multiplexing the acknowledgement for HARQ ID 5, 6, and 0 in subframe 6 and bundling or multiplexing the acknowledgement for HARQ ID 5, 6, 0, and 1 in subframe 7.

The HARQs may be transmitted using at least one of ACK/NACK bundling when the number of HARQs to be transmitted is below a first threshold and/or ACK/NACK multiplexing when the number of HARQs to be transmitted is above a second threshold. The first and second threshold may be the same threshold so that HARQs below the threshold are bundled and HARQs above the threshold are multiplexed. Alternately, the first and second threshold may be different.

At 1210, the UE may receive information from the eNB that the UE can use to make PUCCH transmissions including ACK(s)/NACK(s) for HARQs. This may include information regarding whether to multiplex or bundle the ACK(s)/NACK(s) for multiple HARQs, e.g., such as receiving signaling information regarding the ACK/NACK bundling used for transmitting the HARQs. This may include receiving information that assist the UE in determining the subframes for PUCCH transmissions. For example, the UE may receive from the eNB an indication of a separate set of valid subframes for PUCCH. As another example, the UE may receive from the eNB an indication to use one of a defined set of PUCCH configurations for PUCCH transmissions. As another example, the UE may receive a trigger to transmit a group ACK. Using such information, the UE may determine at 1212, the subframes to be used for PUCCH.

At 1214, the UE may determine a HARQ repetition value dependent on a number of multiplexed ACKs/NACKs. For example, a lower number of repetitions may be used for a single HARQ than for multiple HARQs. The repetition value for an ACK/NACK may also be based on an available headroom power.

At 1216, the UE may determine a TTI bundle size for PUCCH transmissions, e.g., based on whether ACK multiplexing is available.

When a subframe is scheduled for both an ACK or NACK for a single HARQ and for a repetition of a multiplexed ACK or NACK for multiple HARQs, and PUCCH resources for single HARQ and multiplexed HARQs are different, the UE may use the PUCCH resource assigned to single HARQ for the repetition of the multiplexed ACK or NACK for multiple HARQs, when an ACK is scheduled for the single HARQ use the PUCCH resource assigned to multiplexed HARQs for the repetition of the multiplexed ACK or NACK for multiple HARQs, when an NACK is scheduled for the single HARQ.

When a subframe is scheduled for both an ACK or NACK for a single HARQ and for a repetition of a multiplexed ACK or NACK for multiple HARQs, and the PUCCH resources for single HARQ and multiplexed HARQs are the same, the UE may superimpose the ACK or NACK for the single HARQ on a reference signal of a PUCCH.

As illustrated at 1218, the UE may also receive an M-PDCCH, and the PDSCH may be self subframe scheduling. Thus, the PDSCH may overlap the M-PDCCH in time, as described in connection with FIGS. 5 and 9.

Figure 13:
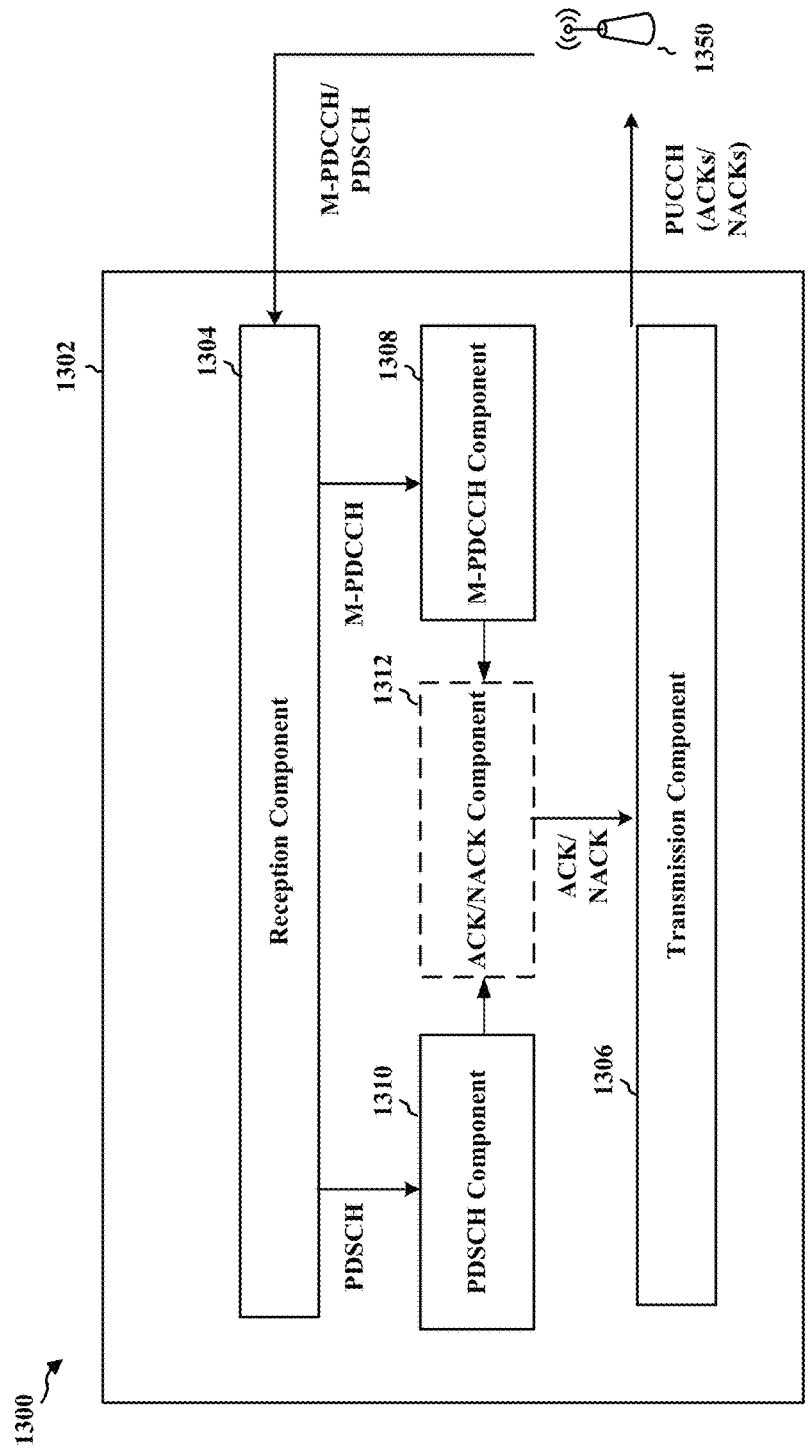
FIG. 13 is a conceptual data flow diagram illustrating the data flow between different means/components in an example HD-FDD apparatus, e.g., an eMTC apparatus.

FIG. 13 is a conceptual data flow diagram 1300 illustrating the data flow between different means/components in an exemplary apparatus 1302, e.g., communicating using eMTC. The apparatus may be a UE. The apparatus includes a reception component 1304 that receives DL wireless communication from eNB 1350, such as M-PDCCH, PDSCH, etc. The apparatus includes a transmission component 1306 that transmits UL communication to eNB 1350, such as HARQ ACK(s)/NACK(s). The apparatus includes a PDSCH component 1310 that receives a PDSCH transmission from the eNB 1350 and an ACK/NACK Component 1312 that transmits an acknowledgement for a plurality of HARQs within a single subframe using at least one of ACK/NACK bundling or ACK/NACK multiplexing. The apparatus may also include an M-PDCCH component 1308 that receives an M-PDCCH transmission from eNB, wherein the PDSCH is transmitted using self subframe scheduling and overlaps the M-PDCCH in time, as described in connection with FIGS. 5 and 9.

The apparatus may include additional components that perform each of the blocks of the algorithm in the aforementioned flowcharts of FIG. 12. As such, each block in the aforementioned flowcharts of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
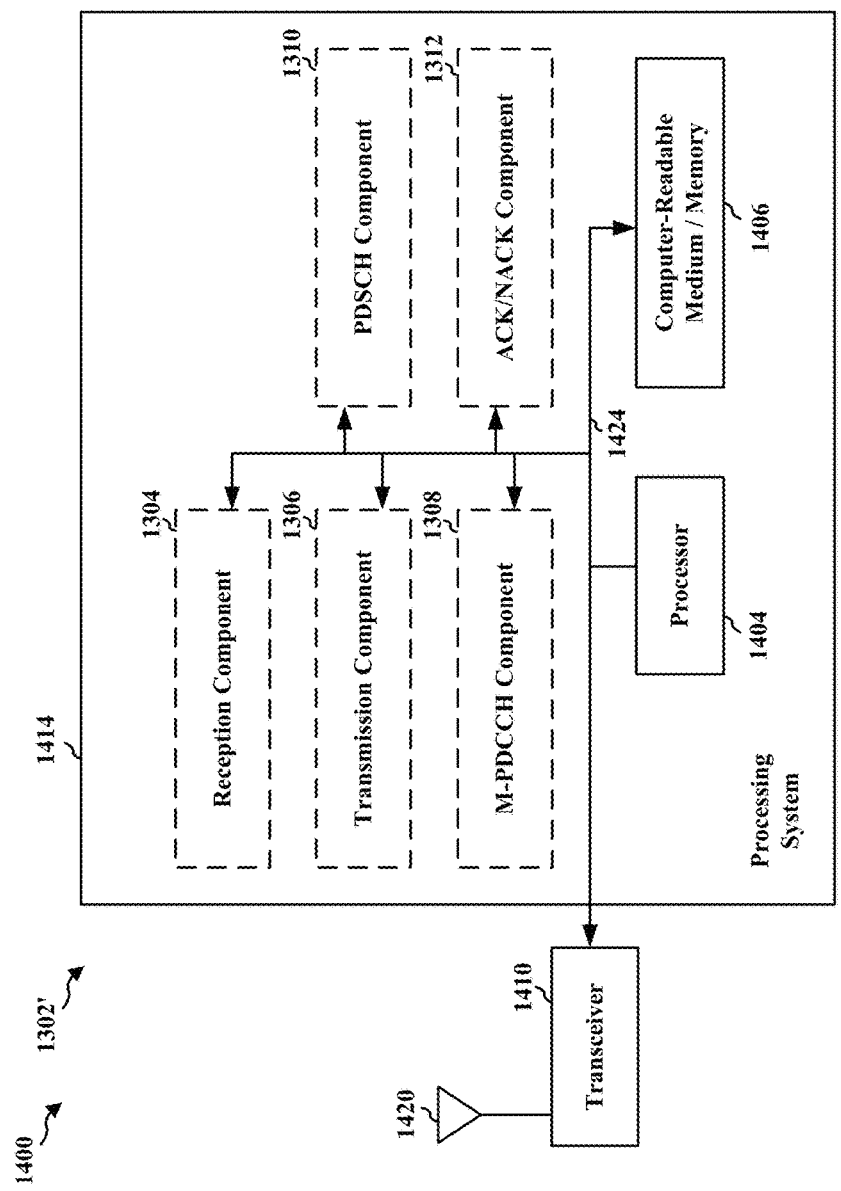
FIG. 14 is a diagram illustrating an example of a hardware implementation for an HD-FDD apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, 1312, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1306, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310, 1312. The components may be software components running in the processor 1404, resident/stored in the computer readable medium/memory 1406, one or more hardware components coupled to the processor 1404, or some combination thereof. The processing system 1414 may be a component of the UE 350 and may include the memory 360 and/or at least one of the TX processor 368, the RX processor 356, and the controller/processor 359.

In one configuration, the apparatus 1302/1302' for wireless communication includes means for receiving a plurality of consecutive subframes of a PDSCH and means for transmitting an acknowledgement for a plurality of HARQs within a single subframe using at least one of ACK/NACK bundling or ACK/NACK multiplexing, means for bundling ACK(s)/NACK(s), means for multiplexing ACK(s)/NACK(s), means for receiving, means for transmitting, means for determining a HARQ repetition value, and means for determining a TTI bundle size for PUCCH transmission. The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication using half duplex frequency division duplex (HD-FDD), comprising:
 receiving a plurality of consecutive subframes of a Physical Downlink Shared Channel (PDSCH) at an HD-FDD UE;
 using a number of Hybrid Automatic Repeat Requests (HARQs) scheduled for transmission in a single subframe to select, at the HD-FDD UE, between using ACK/NACK bundling or ACK/NACK multiplexing to combine the number of HARQs within the single subframe for the plurality of consecutive subframes of the PDSCH, wherein ACK/NACK bundling is selected when the number of HARQs to be combined for transmission within the single subframe is below a first threshold and ACK/NACK multiplexing is selected when the number of HARQs to be combined for transmission within the single subframe is above a second threshold; and
 transmitting an acknowledgement for the number of HARQs within the single subframe using the ACK/NACK bundling when the number of HARQs combined for transmission within the single subframe is below the first threshold and using the ACK/NACK multiplexing when the number of HARQs combined for transmission within the single subframe is above the second threshold.

2. The method of claim 1, wherein the transmitting the acknowledgement comprises transmitting an acknowledgement for an increased number of HARQs.

3. The method of claim 2, wherein the increased number of HARQs is greater than 8.

4. The method of claim 1, further comprising:
 receiving signaling information regarding the ACK/NACK bundling to be used for transmitting acknowledgement for the HARQs.

5. The method of claim 1, further comprising:
 receiving a separate set of valid subframes for Physical Uplink Control Channel (PUCCH).

6. The method of claim 1, further comprising:
 using one of a defined set of Physical Uplink Control Channel (PUCCH) configurations for PUCCH transmissions.

7. The method of claim 1, further comprising:
 receiving an indication to a transmit a group acknowledgement wherein the acknowledgement for the number of HARQs is transmitted in response to receiving the indication to transmit the group acknowledgement.

8. The method of claim 1, further comprising:
 using a different HARQ repetition value depending on a number of multiplexed acknowledgements or negative acknowledgements.

9. The method of claim 8, wherein a lower number of repetitions is used for a single Hybrid Automatic Repeat Request (HARQ) than for multiple HARQs.

10. The method of claim 1, further comprising:
 determining a Transmission Time Interval (TTI) bundle size for Physical Uplink Control Channel (PUCCH) transmissions based on whether ACK multiplexing is enabled.

11. The method of claim 1, further comprising:
 determining a repetition value for an ACK or a NACK based on an available power headroom.

12. The method of claim 1, wherein when a subframe is scheduled for both an ACK or a NACK for a single HARQ and for a repetition of a multiplexed ACK or multiplexed NACK for multiple HARQs, and Physical Uplink Control Channel (PUCCH) resources assigned for the single HARQ and a multiplexed HARQs are different, the method further comprises:
 using the PUCCH resources assigned to the single HARQ for the repetition of the multiplexed ACK or multiplexed NACK for the multiple HARQs, when an ACK is scheduled for the single HARQ; and
 using the PUCCH resource assigned to the multiplexed HARQs for the repetition of the multiplexed ACK or multiplexed NACK for the multiple HARQs, when an NACK is scheduled for the single HARQ.

13. The method of claim 1, wherein when a subframe is scheduled for both an ACK or a NACK for a single HARQ and for a repetition of a multiplexed ACK or multiplexed NACK for multiple HARQs, and the PUCCH resources for the single HARQ and a multiplexed HARQs are the same, the method further comprises:
 superimposing the ACK or NACK for the single HARQ on a reference signal of a Physical Uplink Control Channel (PUCCH).

14. The method of claim 1, wherein the wireless communication comprises enhanced machine type communication (eMTC).

15. An apparatus for wireless communication using half duplex frequency division duplex (HD-FDD), comprising:
 a memory; and
 at least one processor coupled to the memory and configured to:
  receive a plurality of consecutive subframes of a Physical Downlink Shared Channel (PDSCH) at an HD-FDD UE;
  use a number of Hybrid Automatic Repeat Requests (HARQs) scheduled for transmission in a single subframe to select, at the HD-FDD UE, between using ACK/NACK bundling or ACK/NACK multiplexing to combine the number of HARQs within the single subframe for the plurality of consecutive subframes of the PDSCH, wherein ACK/NACK bundling is selected when the number of HARQs to be combined for transmission within the single subframe is below a first threshold and ACK/NACK multiplexing is selected when the number of HARQs to be combined for transmission within the single subframe is above a second threshold; and
  transmit an acknowledgement for the number of HARQs within the single subframe using the ACK/NACK bundling when the number of HARQs combined for transmission within the single subframe is below the first threshold and using the ACK/NACK multiplexing when the number of HARQs combined for transmission within the single subframe is above the second threshold.

16. The apparatus of claim 15, wherein the transmitting the acknowledgement comprises transmitting an acknowledgement for an increased number of HARQs.

17. The apparatus of claim 15, wherein the at least one processor is further configured to:
 receive an indication to a transmit a group acknowledgement, wherein the acknowledgement for the number of HARQs is transmitted in response to receiving the indication to transmit the group acknowledgement.

18. The apparatus of claim 15, wherein the at least one processor is further configured to:
   use a different HARQ repetition value depending on a number of multiplexed acknowledgements or negative acknowledgements.

19. The apparatus of claim 15, wherein the at least one processor is further configured to:
   determine a Transmission Time Interval (TTI) bundle size for Physical Uplink Control Channel (PUCCH) transmissions based on whether ACK multiplexing is enabled.

20. The apparatus of claim 15, wherein the at least one processor is further configured to:
   determine a repetition value for an ACK or a NACK based on an available power headroom.

21. The apparatus of claim 15, wherein when a subframe is scheduled for both an ACK or NACK for a single HARQ and for a repetition of a multiplexed ACK or multiplexed NACK for multiple HARQs, and Physical Uplink Control Channel (PUCCH) resources assigned for the single HARQ and a multiplexed HARQs are different, the at least one processor is further configured to:
   use the PUCCH resources assigned to the single HARQ for the repetition of the multiplexed ACK or multiplexed NACK for the multiple HARQs, when an ACK is scheduled for the single HARQ; and
   use the PUCCH resource assigned to the multiplexed HARQs for the repetition of the multiplexed ACK or multiplexed NACK for the multiple HARQs, when an NACK is scheduled for the single HARQ.

22. The apparatus of claim 15, wherein when a subframe is scheduled for both an ACK or a NACK for a single HARQ and for a repetition of a multiplexed ACK or multiplexed NACK for multiple HARQs, and the PUCCH resources for the single HARQ and a multiplexed HARQs are the same, the at least one processor is further configured to:
   superimpose the ACK or NACK for the single HARQ on a reference signal of a Physical Uplink Control Channel (PUCCH).

* * * * *